US007120677B1

(12) United States Patent
Berger et al.

(10) Patent No.: US 7,120,677 B1
(45) Date of Patent: Oct. 10, 2006

(54) SYSTEM AND METHOD FOR INTEGRATED PROCESSING OF INFORMATION FROM A PLURALITY OF DATA SYSTEMS

(75) Inventors: Nancy Berger, Dunwoody, GA (US); Leslie Brown, Atlanta, GA (US); Victoria Elliot, Palm Bay, FL (US); David Geiger, Hoschton, GA (US); John Hedges, Alpharetta, GA (US); Amanda Martin, Paris, IL (US); Valerie Matthews, Atlanta, GA (US); John Morton, Cumming, GA (US); Steve Peacock, Suwanee, GA (US); Keith Romano, Suwanee, GA (US); Jeffrey Seymour, Douglasville, GA (US); Gina Smith, Atlanta, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 762 days.

(21) Appl. No.: 09/712,930

(22) Filed: Nov. 16, 2000

(51) Int. Cl.
*G06F 15/16* (2006.01)

(52) U.S. Cl. ...................................... 709/219; 709/227

(58) Field of Classification Search ........ 709/227–229, 709/202, 217–219; 714/4, 43; 705/7–8, 705/35–36; 719/315, 316
See application file for complete search history.

(56) References Cited

U.S. PATENT DOCUMENTS

| | | | | |
|---|---|---|---|---|
| 5,655,077 | A * | 8/1997 | Jones et al. .................. | 713/201 |
| 6,065,679 | A * | 5/2000 | Levie et al. ............ | 235/462.47 |
| 6,101,198 | A * | 8/2000 | Koenig et al. ............... | 370/535 |
| 6,182,229 | B1 * | 1/2001 | Nielsen ....................... | 713/202 |
| 6,240,512 | B1 * | 5/2001 | Fang et al. .................. | 713/150 |
| 6,243,816 | B1 * | 6/2001 | Fang et al. .................. | 713/202 |
| 6,256,676 | B1 * | 7/2001 | Taylor et al. ................ | 709/246 |
| 6,269,405 | B1 * | 7/2001 | Dutcher et al. ............. | 709/248 |
| 6,611,916 | B1 * | 8/2003 | Cacace-Bailey et al. .... | 713/201 |
| 6,714,978 | B1 * | 3/2004 | Porter ......................... | 709/224 |
| 6,725,238 | B1 * | 4/2004 | Auvenshine ................ | 707/200 |
| 6,785,726 | B1 * | 8/2004 | Freeman et al. ............ | 709/227 |
| 6,801,946 | B1 * | 10/2004 | Child et al. ................. | 709/230 |
| 6,851,060 | B1 * | 2/2005 | Shrader ........................ | 726/10 |
| 2002/0062270 | A1 * | 5/2002 | Star ............................. | 705/36 |
| 2003/0120546 | A1 * | 6/2003 | Cusack et al. ................ | 705/16 |

OTHER PUBLICATIONS

Novell, Inc. "Novell Single Sign-on Makes Network Access a Reality", Press Release, Provo, Utah, Jul. 21, 1999.*

* cited by examiner

*Primary Examiner*—David Wiley
*Assistant Examiner*—Joseph E. Avellino
(74) *Attorney, Agent, or Firm*—Withers & Keys, LLC

(57) ABSTRACT

Systems and methods to integrate processing of information from a plurality of data systems. In an embodiment, a system includes a network connection, which can receive information sent to and from a terminal. The network connection is coupled to a first network, and the first network is coupled to the terminal. The system can also include a plurality of data system connections, where each data system connection of the plurality of data system connections can receive information sent to and from a respective data system of a plurality of data systems. A server is coupled to the network connection and the plurality of data system connections. In an embodiment, the server includes a processor and a memory coupled to the processor. The memory can include a plurality of data system instructions objects, where each data system instructions object of the plurality of data system instructions objects corresponds to a respective data system of the plurality of data systems. Each data system instructions object can manage communications between the terminal and the respective data system of the plurality of data systems.

20 Claims, 4 Drawing Sheets

SYSTEM AND METHOD FOR INTEGRATED PROCESSING OF INFORMATION FROM A PLURALITY OF DATA SYSTEMS

FIELD OF THE INVENTION

The present invention relates to information management systems. More particularly, the present invention relates to systems and methods for integrated processing of information from a plurality of data systems.

BACKGROUND OF THE INVENTION

A business, such as a retail store, can be connected to a plurality of network systems for access to customer and business information. For example, a business may be connected to a Point-of-Sale (POS) system that provides accounting (e.g., general ledger accounting) and cash management services. The accounting services can track costs related to inventory, sales revenues, and other accounting figures. The cash management services can manage cash flows, bank deposits, cash drawer reconciliation, and so on. Access to the POS system may be controlled by requiring the entry of login information (e.g., a user identification, a password). Management of the business's inventory may be performed by an inventory system that is separate from the POS system. The inventory system can perform inventory management functions such as inventory ordering, inventory receiving, sales from inventory, returns to inventory, and inventory reordering. Access to the inventory system can also require entry of the appropriate login information, but the login information for access to the inventory system can be different than the login information for access to the POS system.

The business may also accept credit cards for payments of the costs of goods and services. Also, the business may be offering business services such that conducting a credit determination (e.g., a consumer credit evaluation) prior to entering into a service agreement is advantageous. A credit card services system can provide credit card services (e.g., provide credit card authorizations, guarantees of payment, and so forth) to the business. The business may also receive credit information from a credit system prior to making a credit determination. To manage customer accounts, the business may have a customer services system that includes data related to customer accounts, balances, and other customer information. The provision of services (e.g., wireless communications services, Internet access services, communications services, data services) can require activation systems that manage activation of customer accounts. For example, a business providing wireless communications services can have an activation system that manages establishment of billing for wireless service and provisioning of wireless services to a wireless communications device. Access to each of these service systems—e.g., the credit service systems, the customer service system, and the activation system—may be discrete, and each service system can require different login information for access and use of each system.

The use of each of these service systems can individually enhance business productivity, employee productivity and customer satisfaction with respect to each specific service. However, when an employee or customer transaction requires interaction with a plurality of the service systems, there can be errors and inefficiencies. For example, a customer transaction may require establishment of separate transaction sessions with different service systems that can involve entry of distinct login information, rekeying of customer information, rekeying of product and/or service information, and so on.

Inefficiencies can also arise from a service system requirement that there be an operating network communications link between a client terminal (e.g., a POS terminal, a personal computer (PC) at retail establishment) and a server (e.g., a network server, a server of a network data center). The network communications link can provide real-time data communications between the client terminal and the server, and can be a Wide Area Network (WAN) communications link, a Local Area Network (LAN) communications link, an HTTP network communications link (e.g., an Internet communications link), and so forth. Whereas many client terminals are able to operate in an off-line mode (e.g., without an operating network communications link), certain transactions typically require an operating network communications link. For example, credit card service systems typically require a network communications link in order for credit authorization queries and replies. An activation system for provisioning of wireless services can be dependent upon a credit determination that requires receipt at a client terminal of credit information from a credit services system.

In view of the foregoing, it can be appreciated that a substantial need exists for systems and methods that can advantageously provide for integrated processing of information from a plurality of data systems.

SUMMARY OF THE INVENTION

The present invention is a system that integrates processing of information from a plurality of data systems. For example, a user may require access to a plurality of data systems including a credit services system, an inventory services system, a customer account services system, and an activations system. Each of such data systems may have unique login information particular to each user and data system. In a preferred embodiment of the present invention, an application server can integrate processing of information from each of such data systems to increase user efficiency and access with respect to the data systems.

In the preferred embodiment, the system includes a network connection, which can receive information sent to and from a terminal. The terminal can be, for exampe, a POS terminal at a retail location. The network connection can be coupled to a Wide Area Network (WAN), and the WAN can be coupled to the terminal. The system can also include a plurality of data system connections, where each data system connection of the plurality of data system connections can receive information sent to and from a respective data system of a plurality of data systems. The data systems of the plurality of data systems can be selected from the group including a credit services system, an inventory services system, a customer account system, and an activations services system. A server can be coupled to the network connection and the plurality of data system connections.

In an embodiment, the server includes a processor and a memory coupled to the processor. The memory can include a plurality of data system instructions objects, where each data system instructions object of the plurality of data system instructions objects corresponds to a respective data system of the plurality of data systems. The data system objects can be object-oriented software modules, Java beans, and so forth. Each data system instructions object can manage communications between the terminal and the respective data system of the plurality of data systems.

DETAILED DESCRIPTION OF THE INVENTION

According to the preferred embodiment of the present invention, a system integrates processing of information from a plurality of data systems. In the preferred embodiment, the system includes a network connection, which can receive information sent to and from a terminal. The network connection can be coupled to a first network, and the first network can be coupled to the terminal. The system can also include a plurality of data system connections, where each data system connection of the plurality of data system connections can receive information sent to and from a respective data system of a plurality of data systems. A server can be coupled to the network connection and the plurality of data system connections. In an embodiment, the server includes a processor and a memory coupled to the processor. The memory can include a plurality of data system instructions objects, where each data system instructions object of the plurality of data system instructions objects corresponds to a respective data system of the plurality of data systems. Each data system instructions object can manage communications between the terminal and the respective data system of the plurality of data systems.

Figure 1:
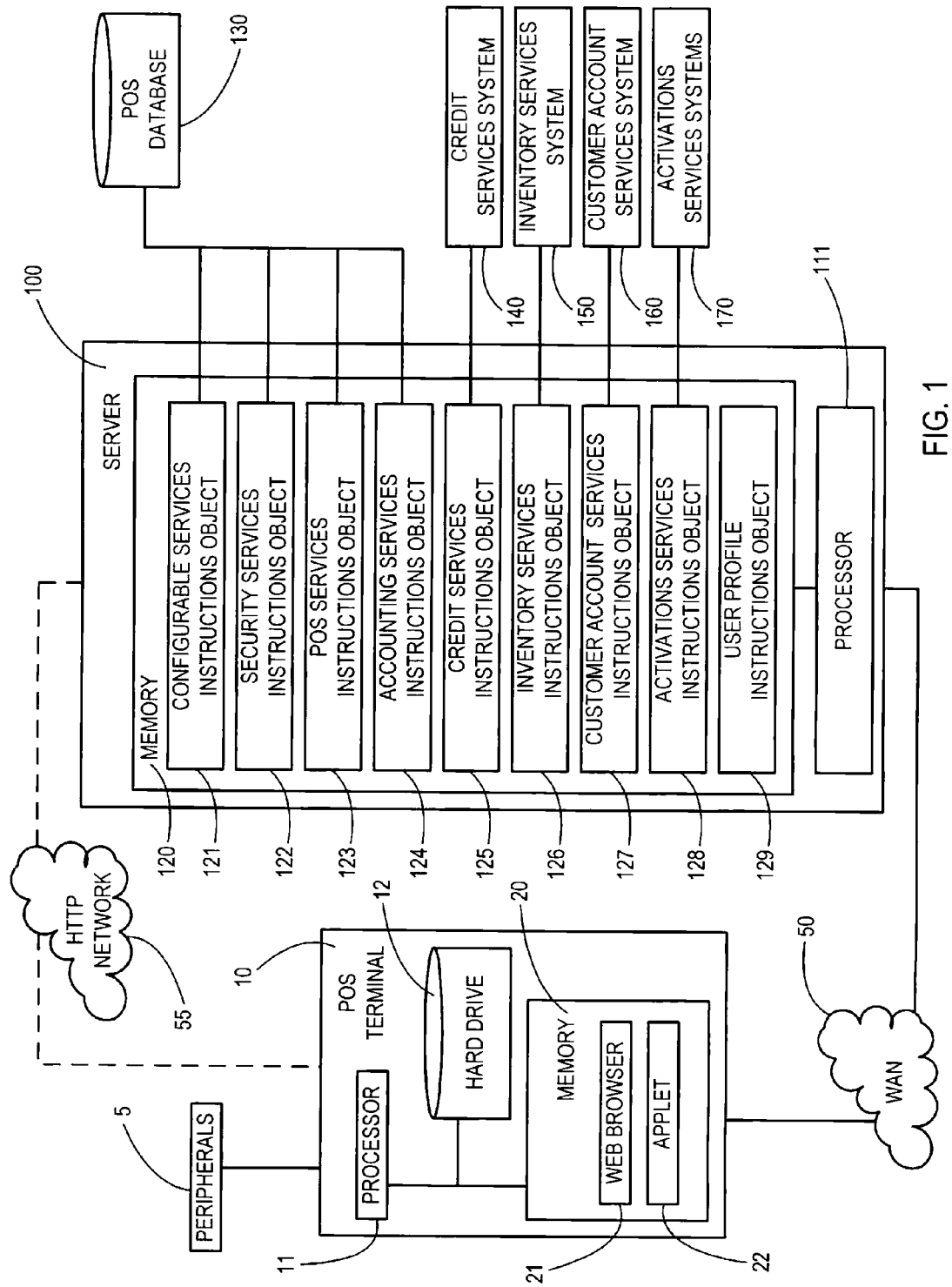
FIG. 1 is a schematic diagram of a preferred embodiment of the present invention.

FIG. 1 is a schematic diagram of the preferred embodiment of the present invention. A Point-of-Sale (POS) terminal 10 is coupled to server 100, and server 100 is coupled to a plurality of data systems including credit services system 140, inventory services system 150, customer account services system 160, and activations services system 170. Embodiments of the present invention can provide integrated processing of information from a plurality of data systems. For example, server 100 can provide a user interface (e.g., a graphical interface, a web-enabled interface) to a user at POS terminal 10 that integrates interaction with the plurality of data services.

In the preferred embodiment, server 100 includes a processor 111 and a memory 120. Processor 111 can be, for example, an Intel Pentium® III processor, manufactured by Intel Corp. of Santa Clara, Calif. As another example, processor 111 can be an Application Specific Integrated Circuit (ASIC). Server 100 can be, for example, a UNIX server from Sun Microsystems, Inc. of Palo Alto, Calif. Memory 120 may be a random access memory (RAM), a dynamic RAM (DRAM), a static RAM (SRAM), a volatile memory, a non-volatile memory, a flash RAM, a cache memory, a hard disk drive, a magnetic storage device, an optical storage device, a magneto-optical storage device, or a combination thereof.

Server 100 also can be, for example, a plurality of coupled servers. As used to describe embodiments of the present invention, the term "coupled" encompasses a direct connection, an indirect connection, or a combination thereof. Moreover, two devices that are coupled can engage in direct communications, in indirect communications, or a combination thereof. In an embodiment in which server 100 is a plurality of coupled servers, such as a first server coupled to a second server, the first server can be an Oracle® 8i R2 JServer and the second server can be an Oracle Application Server. Oracle Corporation is headquartered in Redwood Shores, Calif.

Memory 120 of server 100 can store a plurality of data system instructions objects. Each data system instructions object of the plurality of data system instructions objects can interface with a respective data system of a plurality of data systems coupled to server 100. For example, each data system instructions object of the plurality of data systems instructions objects can manage communications between POS terminal 10 and the respective data system of the plurality of data systems. In an embodiment, the plurality of data system instruction objects include credit services instructions object 125, inventory services instructions object 126, customer account services instructions object 127, and activation services instructions object 128. For example, the plurality of data system instructions objects can be constructed using Object Oriented (OO) development methods. For example, a data system instructions object can be a Java bean (e.g., a capsulation of Java code that can be run on a plurality of computer systems such as a UNIX system, a Windows® NT system, etc.).

The credit services instructions object 125 interfaces with the credit services system 140 coupled to server 100. Credit services system 140 is coupled to server 100 via a data connection (e.g., a network port, an input/output port, a port and a communications link, etc.). The credit services system 140 can be an internal system (e.g., where server 100 and credit services system 140 are operated by the same entity) or an external system (e.g., the credit services system 140 is operated by a third-party, or the credit services system 140 is operated by a third-party that has a contractual relationship with the operator of server 100). Credit services system 140, in an embodiment, can provide credit evaluations (e.g., a credit report, a credit evaluation based at least in part on a credit report, etc.). In another embodiment, credit services system 140 is a credit card services system that can provide a credit card payment authorization, a credit card payment guarantee, and other credit services.

Inventory services instructions object 126 interfaces with the inventory services system 150 coupled to server 100. Inventory services system 150 is coupled to server 100 via a data connection and may be an internal system or an external system. Inventory services system 150, for example, can provide inventory services such as inventory ordering, receiving, tracking, relief, and so on.

Customer account services instructions object 127 interfaces with the customer account services system 160 coupled to server 100. Customer account services inventory services system 160 is coupled to server 100 via a data connection and may be an internal system or an external system. Customer account services system 160, for example, can provide customer account services such as storing customer information, maintaining billing information, printing customer contracts, and so forth.

Activation services instructions object 127 interfaces with the activations services system 170 coupled to server 100. Activations services system 170 is coupled to server 100 via a data connection and may be an internal system or an external system. Activations services system 170, for example, can provide activations services such as managing activation of customer accounts and/or establishment of services. For example, a business providing wireless communications services can have an activation system that manages establishment of billing for wireless services and provisioning of wireless services to a wireless communications device.

In a preferred embodiment of the present invention, each data system of the plurality of data systems 140, 150, 160, and 170 has unique user access rights. For example, a user that has access rights to each of data systems 140, 150, 160, and 170 may have a unique login and password for each data system. Each data system of data systems 140, 150, 160, and 170 includes a data system application that manages operation and/or access to the respective data system. A data system application can control a user's access to the corresponding data system (e.g., a user may have read-only access rights, a user may have read and modify access rights, a user may have limited access to data stored on the data system, etc.).

Terminal 10 sends login information of a user to server 100. In an embodiment, terminal 10 is coupled to server 100 via WAN 50 and a network connection (e.g., data port, input/output port, etc.). Terminal 10, in another embodiment, can be coupled to server 100 via WAN 50 and/or HTTP network 55. For example, HTTP network 55 can be the Internet. Server 100 can receive the login information of the user and determine whether the user has system access rights. For example, a user profile instructions object 129 can access a user profile (e.g., a database of user access rights, etc.) and determine whether the user has system access rights. In addition, the user profile instructions object 129 can determine whether the user has access rights with respect to the data systems of the plurality of data systems. In an embodiment, the user profile instructions object 129 can also determine the extent of access rights with respect to each data system of the plurality of data systems.

In accordance with a preferred embodiment of the present invention, a user at POS terminal 10 can access each of the data systems of the plurality of data systems after entering only one set of login information. Based at least in part on the user's login information, the server 100 can access the user's login information for each particular data system (e.g., by recalling such information from a user profile, a look-up table, a database, or other data structure) and grant the user access to each of the appropriate data systems of the plurality of data systems. Table 1 below illustrates a user profile storing a user's system login information and login information for a plurality of data systems.

TABLE 1

|  | User Identification | User Password |
|---|---|---|
| System | John.Doe | Anony |
| Credit Services System | JD107 | 107JD |
| Inventory Services System | JDoe | Atlanta |
| Customer Account Service System | BSCC831 | unwired1 |
| Activations Services System | JohnDoe831 | Seabrook |

After the user's access rights are determined with respect to a set of data systems, the server 100 can send data system access information to POS terminal 10. For example, POS terminal 10 can display a set of data system applications, where each displayed data system application corresponds to a data system to which the user has access rights. In one embodiment, the POS terminal 10 can display icons corresponding to each such application, and the applications can be executed by POS terminal 10, by server 100, by the corresponding data system, or a combination thereof.

Server 100 is coupled to POS database 130. POS database 130 stores POS services information such as accounting information, cash management information, etc. In an embodiment, server 100 includes a configurable services instructions object 121, a security services instructions object 122, a POS services instruction object 123, and an accounting services object 124. Each of services instructions objects 121–124 and POS database 130 can support POS operations in concert with POS terminal 10. For example, configurable services instructions object 121 can perform functions related to configuration of services. Security services instructions object 122 can perform operations related to security services. POS services instruction object 123 can perform operations related to POS services. Accounting services object 124 can perform operations related to accounting services.

In an embodiment, POS terminal 10 includes a processor 11 coupled to a hard drive 12 and a memory 20. POS terminal can execute a POS application locally (e.g., stored on hard drive 12 and/or in memory 20) or in concert with server 100 and POS database 130. Memory 20 can include a web browser 21 and an applet 22. Web browser 21 can provide a web-based functionality for applications communicated to POS terminal 10 or executed on POS terminal 10. Applet 22 can provide security functionality for screen access to POS terminal 10. POS terminal 10 can also be coupled to peripherals 5, which can perform or assist in POS operations. For example, peripherals 5 can include a barcode scanner to assist in inventory and sale operations and a printer to print customer receipts and service agreements.

Each of the data communications links between terminal 10 and server 100, and between server 100 and each data system of the plurality of data systems, can be one of a variety of data communications links. Examples of the types of data communications links that can couple the terminal 10 and the plurality of data systems to server 100 include a dedicated WAN communications link, an HTTP communications link, a JDBC (Java DataBase Connectivity) communications link (e.g., a Java programming interface to a SQL database), a TCP socket communications link, or a remote method invocation (RMI) data communications link.

POS terminal 10 is typically coupled to server 100 via WAN 50. In the event of a WAN outage, terminal 10 can be coupled to server 100 via HTTP network 55. Alternatively, in the event of an outage of server 100, POS terminal 10 can operate in a stand-alone mode to provide at least partial functionality to a user. For example, hard drive 12 can store POS application off-line instructions that can provide POS application functionality when data communications with server 100 are lost.

Figure 2:
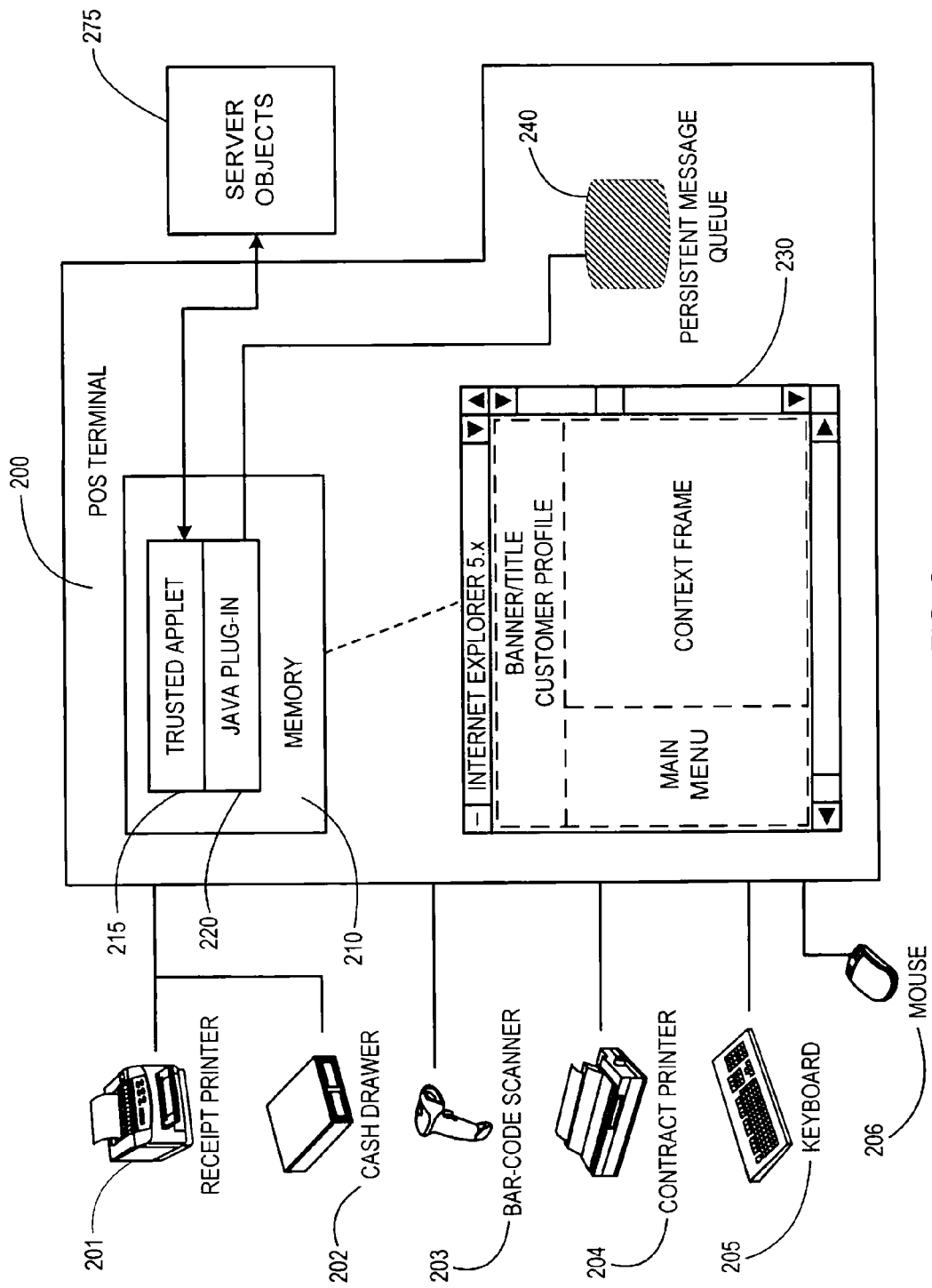
FIG. 2 is a schematic diagram showing a client perspective of a preferred embodiment of the present invention.

FIG. 2 is a schematic diagram showing a client perspective of a preferred embodiment of the present invention. In this embodiment, a POS terminal 200 can be coupled to a receipt printer 201, a cash drawer 202, a bar-code scanner 203, a contract printer 204, a keyboard 205, and a mouse 206. POS Terminal 200 can include a memory 210, and memory 210 can include trusted applet 215 and a Java plug-in 220. The trusted applet 215 and Java plug-in 220 can manage communications with server objects 275 (e.g., such as server objects residing on a server 100 of FIG. 1). Trusted applet 215 and Java plug-in 220 in concert with a web browser can manage the display of browser window 230. Browser window 230 can display applications corresponding to server objects 275.

In an embodiment, bar-code scanner 203 can be a point-of-sale scanner for scanning UPCs (Universal Product Codes). In another embodiment, POS terminal 200 can be coupled to a wireless inventory scanner that can be used for counting inventory. It can scan inventory items numbers and/or serial numbers and can be coupled to POS terminal 200 for transmission of inventory data to at least one of the server objects 275.

In an embodiment of the present invention, POS terminal 200 can operate in a stand-alone mode when data communications between POS terminal 200 and server objects 275 are lost. POS application off-line instructions (e.g., a program or program module that can perform local POS application functionality) can be stored in memory 210, in local storage (e.g., a hard disk, an optical storage device, non-volatile memory, etc.), a combination thereof. The POS application off-line instructions can store POS transaction information in persistent message queue 240 when the POS terminal 200 is operating in a stand-alone mode. When data connectivity between the POS terminal 200 and server objects 275 is restored, data stored in the persistent message queue 240 can be uploaded to the server objects 275. Inventory application off-line instructions also can be stored in memory 210, in local storage, or a combination thereof. The inventory application off-line instructions can stored inventory transaction information in persistent message queue 240 when the POS terminal 200 is operating in stand-alone mode.

POS terminal 200, in an embodiment, can execute a graphical user interface (GUI) that is separated into frames. For example, browser window 230 is separated into a Banner/Title Customer Profile frame, a Main Menu frame, and a Context Frame. A master applet can be anchored to the Banner/Title Customer Profile frame, allowing the applet to remain in the running state throughout a user session. Additional applets in the same and other frames can control the display and communicate screen level events to the master applet.

The master applet is a logical entity that may be broken into multiple physical applets to improve class loader performance or to simplify component design. The master applet controls interfacing to business logic and sequencing of screens. The master applet can remain in state for the business logic so that loading and unloading of applets in other frames will not result in a loss of state.

GUI display functionality, in an embodiment, is separated into applets within the frame being displayed. The display applets can be responsible for generating the display frame and passing user interface events to the master applet for processing. The separation of screen level functionality from the remainder of application logic can give greater flexibility and lesser impact in an embodiment in which some functionality is migrated from applets to servlets. In an embodiment, a browser displaying browser window 230 has limited features, including no toolbar, no menu bar, no Universal Resource Locator (URL) entry field, no status bar, and is a maximized browser window.

Figure 3:
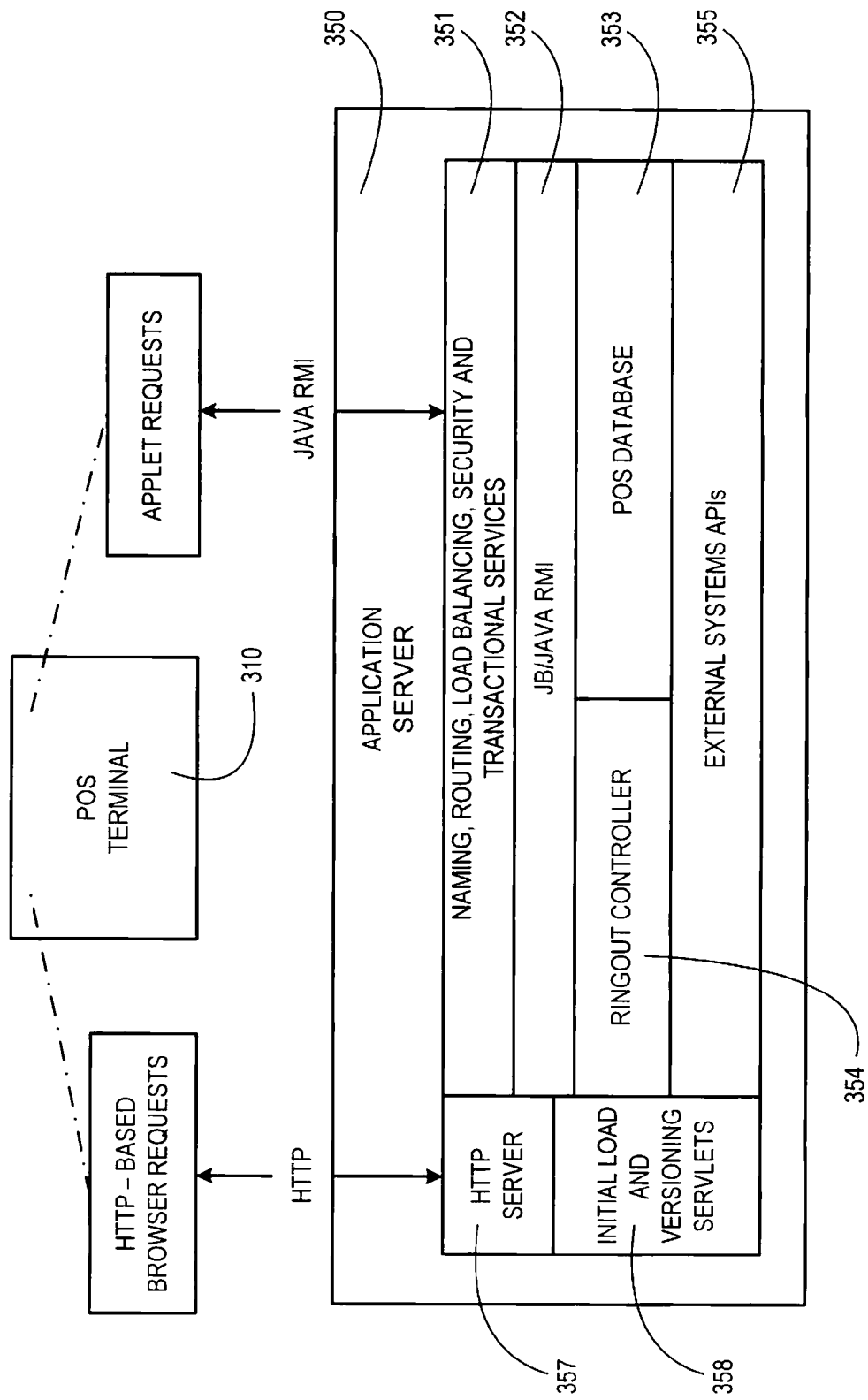
FIG. 3 is a schematic diagram showing a server perspective of a preferred embodiment of the present invention.

FIG. 3 is a schematic diagram showing a server perspective of a system in accordance with an embodiment of the present invention. An application server 350 communicates with a POS terminal 310 through at least one of a plurality of the types of data requests. The plurality of types of data requests may include, for example, HTTP-based browser requests and applet requests. The HTTP-based browser requests can be communicated via HTTP data communications. The applet requests can be communicated via Java RMI data communications. The application server 350 can include, for example, naming, routing, load balancing, security, and transactional services instructions 351 and JB (Java Beans)/Java RMI instructions 352. The application server 350 can also include a POS database 353, a ringout controller 354, and external systems APIs 355. The application server 350 controls the instantiation of processes based on several factors including EJB (Enterprise Java Beans) load balancing, routing, and boundaries of EJB objects. In an embodiment, Enterprise Java Beans include software components that allow coding of business logic without having to code standard services such as load balancing and security.

Figure 4:
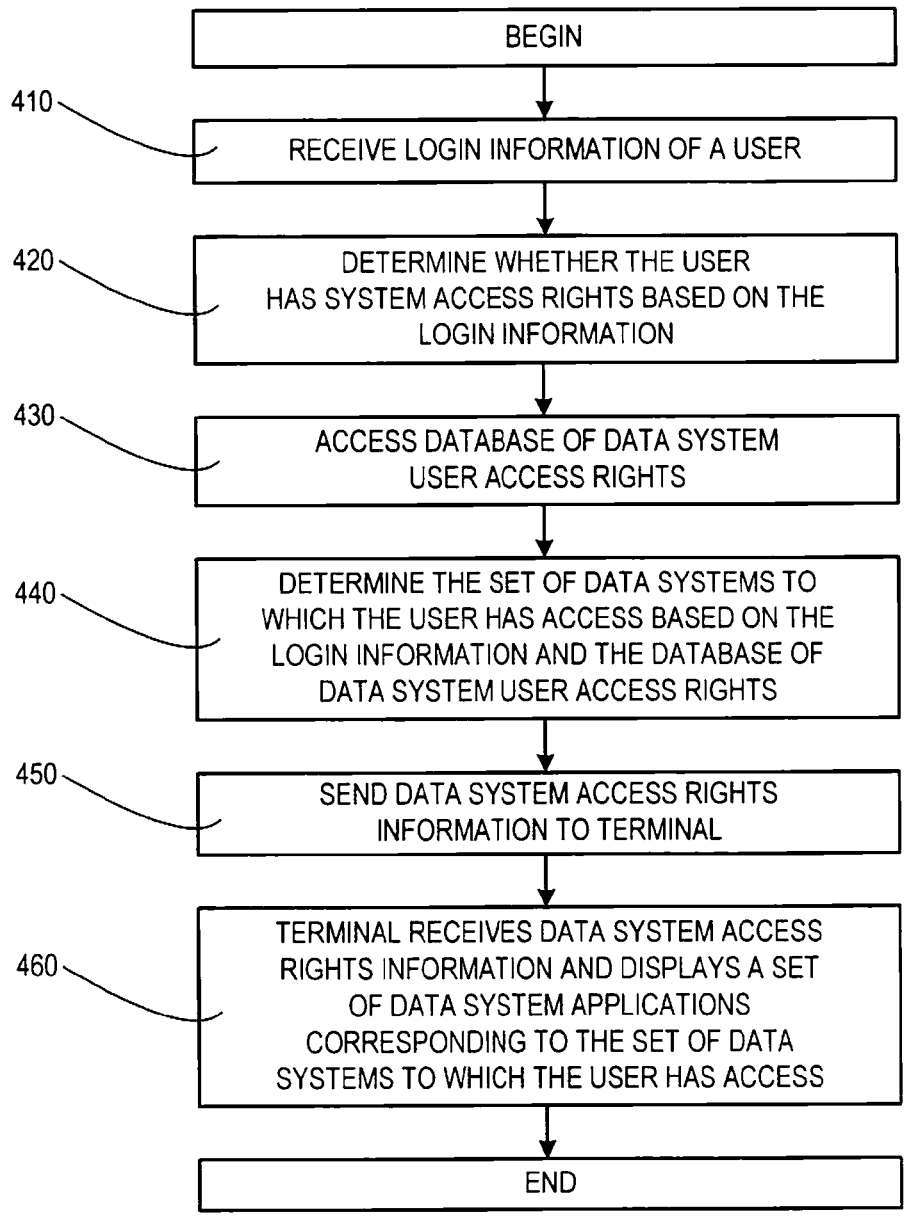
FIG. 4 is a schematic diagram illustrating an embodiment of the present invention.

FIG. 4 is a schematic diagram illustrating an embodiment of the present invention. A server (e.g., server 100 of FIG. 1) can receive login information of a user (box 410). For example, a terminal can receive the login information from the user and send the login information to the server. The server can determine whether the user has system access rights based on the login information (box 420). To determine whether the user has access to data systems in communication with the server, the server can access a database of data system user access rights (box 430). In another embodiment, the server can access a data table, a lookup table, or a data record. The server can determine the set of data systems to which the user has access rights based on the login information and the database of data system user access rights (box 440). Data system access rights information can be sent to a terminal by the server (box 450). The terminal can receive the data system access rights information and display a set of data system applications corresponding to the set of data systems to which the user has access rights (box 460). For example, the terminal can display graphical icons corresponding to the set of data system applications, tabbed pages corresponding to the set of data system applications, etc.

In accordance with an embodiment of the present invention, instructions adapted to be executed by a processor to perform a method are stored on a computer-readable medium. The computer-readable medium can be a device that stores digital information. For example, a computer-readable medium includes a CD-ROM as is known in the art for storing software. The computer-readable medium is accessed by a processor suitable for executing instructions adapted to be executed. The term "adapted to be executed" is meant to encompass any instructions that are ready to be executed in their present form (e.g., machine code) by a processor, or require further manipulation (e.g., compilation, decryption, or provided with an access code, etc.) to be ready to be executed by a processor.

Systems and methods in accordance with the embodiments of the present invention disclosed herein can advantageously integrate processing of information from a plurality of data systems. In an embodiment including a POS terminal, the POS terminal can communicate with the plurality of data systems via an application server. The application server determines the access rights of a user of the POS terminal with respect to the plurality of data systems based on received login information from the terminal and stored login information corresponding the plurality of data systems. The user can thereby access the plurality of data systems without establishing separate sessions with each of the data systems.

Embodiments of systems and methods for integrated processing of information from a plurality of data systems have been described. In the foregoing description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

In the foregoing detailed description, systems and methods in accordance with embodiments of the present invention have been described with reference to specific exemplary embodiments. Accordingly, the present specification and figures are to be regarded as illustrative rather than restrictive.

What is claimed is:

1. A system for integrated processing of information from a plurality of data systems, the system comprising:
    a first network connection, the first network connection adapted to receive information sent from a terminal over a first network and also adapted to receive information sent to the terminal, the terminal displaying a POS application, wherein the terminal includes POS application off-line instructions to provide POS application functions when a data connection between the terminal and the server is inoperable;
    a second network connection, the second network connection being adapted to receive information sent from and to the terminal over a second network, wherein the second network is different from the first network;
    a plurality of data system connections, each data system connection of the plurality of data system connections adapted to receive information sent from a respective data system of a plurality of data systems and also adapted to receive information sent to a respective data system of the plurality of data systems; and
    a server coupled to the first network connection and the plurality of data system connections, the server including
        a processor executing a POS application;
        a point-of-sale (POS) database coupled to the server
        a ringout controller;
        a plurality of external system API's; and
        a memory coupled to the processor, the memory including:
            a plurality of data system instructions objects, wherein each data system instructions object of the plurality of data system instructions objects corresponds to a respective data system of the plurality of data systems, and wherein each data system instructions object manages communications between the terminal and the respective data system of the plurality of data systems by the data system instructions object of the plurality that corresponds to a particular data system communicating through an interface to receive login information from the terminal to thereby create a first communication session with the terminal to exchange transactional data relevant to the particular data system and after logging in a user of the terminal within the first session with the server and by the data systems instruction object communicating with the corresponding data system through a separate application programming interface within a second session separate from the first session in order to exchange transactional data that is based on the exchange of data in the first session between the data systems instruction object of the server and the data system after logging in the user of the terminal within the first session, wherein the server further provides an icon to a GUI rendered at the terminal where the icon represents the data system that the terminal may access through the server and provides access to the data system upon being selected at the terminal and where the icon is displayed by the server at the terminal upon the server completing the login to the data system through the second session that is separate from the first session;
            a trusted applet, and
            a java plug-in, wherein the trusted applet and the java plug-in manage communications with the data systems instruction objects and the display of the terminal GUI, wherein further the GUI is separated into at least a Banner/Title Customer Frame, a Main Menu Frame and a Context Frame, wherein further a master applet is anchored to the Banner/Title Customer Profile Frame, wherein further the master applet is broken down into multiple physical applets.

2. The system of claim 1, wherein:
    the plurality of data system connections include a first data system connection and a second data system connection, wherein the first data system connection and the second data system connection are selected from the group consisting of a credit services system connection, an inventory services system connection, a customer services system connection, and an activations system connection; and
    the plurality of data system instructions objects include a first data system instructions object and a second data system instructions object, wherein the first data system instructions object and the second data system instructions object are selected from the group consisting of a credit services instructions object, an inventory services instructions object, a customer services instructions object, and an activations instructions object, and wherein the first data system instructions object is different from the second data system instructions object.

3. The system of claim 2, wherein the memory includes an accounting services instructions object.

4. The system of claim 1, the system further comprising:
    a point-of-sale (POS) database coupled to the server; and
    the memory includes a POS services instructions object.

5. The system of claim 1, wherein the memory includes a user profile instructions object, wherein the user profile instructions object
    receives login information of the user from the terminal of the first session, and
    determines the access rights of the user for each respective data system of the plurality of data systems.

6. The system of claim 1, wherein the plurality of data systems instructions objects are object-oriented software modules.

7. The system of claim 1, wherein the plurality of data systems instructions objects are Java beans.

8. The system of claim 1, wherein the first network connection is a wide area network port.

9. The system of claim 1, wherein the second network connection is a hypertext transmission protocol network port.

10. The system of claim 1, further comprising the terminal of the user within the first session, the terminal including a processor and a memory coupled to the processor, the memory including a web browser and an applet that communicate with the server during the first session, the terminal coupled to the server via a first network and the first network connection.

11. The system of claim 10, wherein the terminal is adapted to:
  receive login information of a user;
  send the login information of the user to the server; and
  receive information from the server corresponding to each of the respective data systems of the plurality of data systems to which the user has access rights.

12. The system of claim 1, further comprising the terminal of the user, the terminal including a processor and a memory coupled to the processor, the memory including a web browser and an applet that communicate with the server during the first session, the terminal coupled to the server via a first network and the first network connection, and wherein, when the terminal is unable to communicate with the server via the first network and the first network connection, the terminal is coupled to the server via a second network and the second network connection, and wherein the second network is different from the first network.

13. The system of claim 1, further comprising a plurality of data systems, each data system of the plurality of data systems being coupled to the server via a respective data system connection of the plurality of data system connections.

14. The system of claim 1, wherein the plurality of data systems include a first data system and a second data system, the first data system and the second data system being selected from a group consisting of a credit services systems, an inventory services system, a customer account services system, and an activations services system.

15. A system for integrated processing of information from a plurality of data systems, the system comprising:
  a plurality of data systems, each data system of the plurality of data systems having unique user access rights, wherein each data system of the plurality of data systems is associated with a respective data system application of a plurality of data system applications wherein each data system communicates via a data systems instruction object;
  a server coupled to the plurality of data systems through individual communications sessions, the server including a plurality of data system application programming interface instructions, wherein each data system application programming interface instructions of the plurality of data system application programming interface instructions corresponds to a respective data system application of the plurality of data system applications and wherein the data system application programming interface instructions provide a first set of application programming interfaces to each of the respective data system applications enabling transactional data that is based on communications with a terminal to be exchanged between the server and the respective data systems within the individual communications sessions, the server including a data systems user access database that stores user access rights to each data system of the plurality of data systems;
  the terminal coupled to a second interface of the server that is separate from the first set of application programming interfaces and that enables transactional data relevant to one or more data systems to be exchanged between the terminal and the server within a first communications session after logging in of the user of the terminal with the server by receiving login information to create the first session, where the exchange of data with the server is separate from the exchange of data between the server and the data systems of the individual communication sessions after logging in of the user of the terminal within the first session with the server, the terminal including system access instructions, wherein the system access instructions send login information of the user to the server, the terminal displays icons, rendered on a GUI, that represent and provide access to selected data systems applications after the server logs in to each of the selected data systems via the individual communications sessions and then provides a notice of the login to the terminal, the selected data system applications corresponds to a set of data system applications to which the user has access rights, and the set of data system applications to which the user has access rights is determined based at least in part on the login information of the user and the data systems user access database; and
  a trusted applet, and
  a java plug-in, wherein the trusted applet and the java plug-in manage communications with the data systems instruction objects and the display of the terminal GUI, wherein further the GUI is separated into at least a Banner/Title Customer Frame, a Main Menu Frame and a Context Frame, wherein further a master applet is anchored to the Banner/Title Customer Profile Frame, wherein further the master applet is broken down into multiple physical applets.

16. The system of claim 15, wherein the plurality of data systems include a credit services data system, an inventory services data system, a customer account services data system, and an activation services data system.

17. The system of claim 15, further comprising a point-of-sale (POS) database coupled to the server, the server including a POS application, the terminal displaying the POS application.

18. The system of claim 17, wherein the terminal includes POS application off-line instructions to provide POS application functions when a data connection between the terminal and the server is inoperable, and
  a data storage device to store a persistent message queue, wherein the persistent message queue includes POS application data generated by the POS application off-line instructions when the data connection between the terminal and the server is inoperable.

19. The system of claim 15, wherein the plurality of data system interface instructions are object-oriented software modules.

20. The system of claim 15, wherein the plurality of data system interface instructions are Java beans.

* * * * *